United States Patent
Cahill et al.

(10) Patent No.: US 6,238,819 B1
(45) Date of Patent: May 29, 2001

(54) METAL FOAM SUPPORT, ELECTRODE AND METHOD OF MAKING SAME

(75) Inventors: Michael F. Cahill, Mentor; Greg S. Shaw, University Heights, both of OH (US)

(73) Assignee: Stork, N.V. (NL)

( * ) Notice: Subject to any disclaimer, the term of this patent is extended or adjusted under 35 U.S.C. 154(b) by 0 days.

(21) Appl. No.: 09/213,240

(22) Filed: Dec. 17, 1998

Related U.S. Application Data (60) Provisional application No. 60/072,319, filed on Jan. 23, 1998.

(51) Int. Cl.[7] ............... H01M 6/12; H01M 6/46; H01M 6/04; H01M 4/64; H01M 4/80
(52) U.S. Cl. ............... 429/162; 429/206; 429/233; 429/235; 429/243; 29/2
(58) Field of Search ............... 429/162, 233, 429/235, 243, 206; 29/2

(56) References Cited

U.S. PATENT DOCUMENTS

| | | | |
|---|---|---|---|
| 4,439,281 | 3/1984 | Schneider et al. | 204/2.1 |
| 4,755,441 | 7/1988 | Imhof et al. | 429/211 |
| 5,085,956 | 2/1992 | Imhof et al. | 429/211 |
| 5,336,276 | 8/1994 | Pensabene et al. | 29/623.5 |
| 5,518,840 | * 5/1996 | Verhoog et al. | 429/211 |
| 5,549,717 | 8/1996 | Takeuchi et al. | 29/623.2 |
| 5,558,681 | * 9/1996 | Loustau et al. | 29/623.4 |
| 5,578,397 | 11/1996 | Verhoog et al. | 429/211 |
| 5,635,312 | * 6/1997 | Yanagisawa et al. | 429/94 |
| 5,795,680 | * 8/1998 | Ikeda et al. | 429/245 |
| 5,965,295 | * 10/1999 | Bando et al. | 429/223 |
| 6,004,691 | * 12/1999 | Eshraghi | 429/133 |
| 6,025,095 | * 2/2000 | Kawamura | 429/235 |
| 6,037,077 | * 3/2000 | Nowacyzk | 429/94 |
| 6,103,423 | * 8/2000 | Itoh et al. | 429/231.8 |

FOREIGN PATENT DOCUMENTS

| | | |
|---|---|---|
| 418 774 | 3/1991 | (EP) . |
| 0 626 733 | 11/1994 | (EP) . |
| 0 658 945 | 6/1995 | (EP) . |
| 57-080672 | * 5/1982 | (JP) . |

OTHER PUBLICATIONS

Patent Abstracts of Japan—JP 57 080672, May 20, 1982 (Yuasa Battery Co. Ltd.).
Patent Abstracts of Japan—JP 60 235360, Nov. 22, 1985 (Yuasa Denchi KK).
Patent Abstracts of Japan—JP 62 243245, Oct. 23, 1987 (Shin Kobe Electric Mach Co. Ltd.).
Patent Abstracts of Japan—JP 09 161775, Jun. 20, 1997 (Matsushita Electric Ind Co. Ltd.).
Patent Abstracts of Japan—JP 06 196169, Jul. 15, 1994 (Matsushita Electric Ind. Co. Ltd.).
Patent Abstracts of Japan—JP 09 106815, Apr. 22, 1997 (Matsushita Electric Ind Co. Ltd.).
Patent Abstracts of Japan—JP 08 329954, Dec. 13, 1996 (Shin Kobe Electric Mach Co. Ltd.).
Patent Abstracts of Japan—JP 09 022704, Jan. 21, 1997, (Furukawa Battery Co. Ltd.).
Patent Abstracts of Japan—JP 58 100359, Jun. 15, 1983 (Matsushita Denki Sangyo KK).

* cited by examiner

*Primary Examiner*—Patrick Ryan
*Assistant Examiner*—Zidia T. Pittman
(74) *Attorney, Agent, or Firm*—Hudak & Shunk Co., L.P.A.; Michele M. Tyrpak

(57) ABSTRACT

A metal foam support, plus an electrode comprising same, as well as methods of making both, are disclosed, in which there is provided for both the support and the electrode a metal foam member with at least one stacked edge. The stacked edge has a plurality of layers to which a metal connection tab member can be secured. Such an electrode can serve as a negative electrode for a secondary battery.

39 Claims, 3 Drawing Sheets

METAL FOAM SUPPORT, ELECTRODE AND METHOD OF MAKING SAME

CROSS-REFERENCE TO RELATED APPLICATION

This application claims the benefit of U.S. Provisional Application No. 60/072,319, filed Jan. 23, 1998.

FIELD OF THE INVENTION

The present invention relates to a metal foam support member, to an electrode made from the support member and methods of producing each, as well as relating to providing an integral connection tab member to the electrode. The electrode is useful as a battery electrode.

BACKGROUND OF THE INVENTION

Various means have been provided for supplying an electrode connection to a battery terminal. Where a fiber structure electrode framework of metallized plastic fibers is provided, it has been taught, as in U.S. Pat. No. 4,755,441, to weld a current-conducting lug to a reinforced edge of the electrode framework. The current-conducting lug is provided with a stepped area to which the welded connection is made.

U.S. Pat. No. 5,558,681 discloses a method of bonding a metal connection to an electrode having a foam support structure, including a main core and a retaining core. A metal strip is affixed to the support by welding under compression. The strip may be welded along the edge of a retaining core which has been previously disposed to the main core, or the strip can be positioned between the main core and the retaining core.

A connection tab may be made from a single piece of metal foam, as is taught in U.S. Pat. No. 5,578,397 which describes a method of forming an electrode plate and plate head which includes a connection tab. Such connection tab is formed by compressing the support in two directions, resulting in a connection tab having a density of 2.5 times the density of the metal foam support.

It has also been taught to install a connection tab by removing sections of active material where such tabs are to be located and then attaching a thin strip of material such as by spot welding. Thus, U.S. Pat. No. 5,549,717 describes an electrode provided with an electrical lead or tab which has been welded on the outer surface of the electrode in such a manner that the outer surface of the tab is substantially flush with the outer surface of the electrode.

It would, nevertheless, be desirable to provide a foam substrate connection zone which could provide an integral bus to which a connection tab could be secured. It would also be advantageous to provide increased electrical conductivity of an electrode formed from the foam substrate with such connection tab.

SUMMARY OF THE INVENTION

There has now been provided a metal foam support for use in battery applications, which support utilizes an integral bus for securing a connection tab. This can be obtained together with improved securing characteristics, such as improved welding characteristics, and increased electrical conductivity, as in the welded area.

In one aspect, the invention is directed to a metal foam support member in sheet form having. length in the longitudinal direction, width in the transverse direction, thickness in the direction between front and back major faces of said sheet form support member, and first and second long, outer edges in said longitudinal direction positioned at least substantially parallel to one another, which metal foam support member comprises at least substantially one layer of metal foam and has at least one outer edge that is a stacked edge of a plurality of at least two layers of metal foam including at least one layer of said metal foam support member, and with at least one layer of said stacked edge that is a layer situated on a support member major face.

In another aspect, the invention is directed to an electrode comprising a layer of a metal foam support member in sheet form containing an active filling, said metal foam support member having length in the longitudinal direction, width in the transverse direction, thickness in the direction between front and back major faces of said sheet form support member, and first and second long outer edges in said longitudinal direction positioned at least substantially parallel to one another, which metal foam support member comprises at least substantially one layer of metal foam and has at least one outer edge that is a stacked edge of a plurality of at least two layers of metal foam including at least one layer of said metal foam support member, and with at least one layer of said stacked edge that is a layer situated on a support member major face.

In yet another aspect, the invention is directed to a method of producing an electrode comprising a layer of a metal foam support member containing an active filling, said metal foam support member having a length in the longitudinal direction, a width in the transverse direction, front and back major faces, and first and second long, outer edges in said longitudinal direction positioned at least substantially parallel to one another, with at least one outer edge that is a stacked edge of a plurality of at least two layers of metal foam including at least one layer of said metal foam support member, and with at least one edge layer that is situated on a support member face, which method comprises the steps of:

(1) providing a metal foam support member in sheet form as a layer of said metal foam;

(2) establishing at least one of said support member outer edges as a stacked edge comprising at least two metal foam layers, with at least one layer on a major face of said support member;

(3) compressing said stacked edge;

(4) introducing active filling material into said sheet form electrode support member; and (5) cutting said filled support member to provide said electrode as a segment of said filled support member having a compressed stacked edge.

In yet another aspect, the invention is directed to an electrode assembly comprising an electrode having a thin layer of a metal foam support member in sheet form containing an active filling, said metal foam support member having length in the longitudinal direction, width in the transverse direction, thickness in the direction between front and back major faces of said sheet form support member, and first and second long, outer edges in said longitudinal direction positioned at least substantially parallel to one another, which metal foam support member comprises at least substantially one layer of metal foam and has at least one outer edge that is a stacked edge of a plurality of at least two layers of said metal foam support member, and with at least one layer of said stacked edge that is a layer situated on a support member major face, said electrode being spirally wound around a geometric axis.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF THE PREFERRED EMBODIMENTS

As used herein, the term "support member", or sometimes for convenience just "support", refers to the electrically conductive metal reticulate support generally in sheet form, to which there is applied an active filler for preparing an electrode, such as an electrode that can be utilized in a battery. Such support may sometimes be referred to herein as a "substrate".

For preparing the support member such as a nickel metal foam electrode support member, there can initially be used a reticulate three-dimensional precursor material such as a foam, e.g., a polyurethane foam. This may be processed such as by electrolessly, then electrolytically, depositing nickel onto the precursor foam. Other processes include chemical vapor deposition and slurry deposition. The processing may include a sintering step.

Useful polymeric foams are particularly advantageous as the precursor reticulated material, for economy. Those which may be employed include polymeric foams such as polyester polyurethane foam, polyesters and olefin polymers. Examples of commercially available preferred organic polymer substrates include open cell polyurethane foams marketed by Foamex International, Inc., including polyether-polyurethane foams, and polyester polyurethane foams.

A foam, as a representative polyurethane foam, may it have an average number of pores per inch within a wide range, typically within a range of from about 5 to about 130 pores per inch (ppi). The average number of pores per inch is dictated by application. For instance, for an electrode substrate for a nickel metal hydride or nickel-cadmium battery, it may be desirable to utilize a polymer foam having from about 40 to about 150 pores per inch.

It will be understood that non-foam materials may also be employed as precursor reticulate materials. Filaments, including fibers or threads, may serve as a substrate for the deposition of an electroconductive metal, as disclosed in U.S. Pat. No. 4,370,214. An open cell organic or inorganic foam or sponge, prepared using a "pore-former", e.g., discrete "pore-former" beads, pellets and the like, has been disclosed in U.S. Pat. No. 4,517,069. Such technique can be utilized in making a metal foam precursor which may be converted to a metal foam as by heat application. For convenience, however, the reticulate material when processed to metal form will usually be referred to herein for convenience simply as "foam".

The precursor material may have some electrical conductivity. For a polymer foam, this can be achieved by employing any of a number of well-known procedures such as coating with a latex graphite; coating with a metal powder as described in U.S. Pat. No. 3,926,671; electroless plating with a metal such as copper or nickel; sensitizing by application of a metal such as silver, nickel, aluminum, palladium or their alloy as described in U.S. Pat. No. 4,370,214; application of a paint containing carbon powder, or a metal powder such as silver powder or copper powder; coating of a pore-former as described in U.S. Pat. No. 4,517,069; and vacuum deposition of a metal by cathode sputtering with a metal or alloy as disclosed in U.S. Pat. No. 4,882,232. One suitable electroless plating process is disclosed in the EPO published application 0,071,119. Particularly preferred polyurethane foams which are made conductive by coating with a latex graphite are commercially available and are marketed by Foamex International, Inc.

A continuous production process for preparing a preferred metal foam support member in sheet form using an open-cell foam polymeric sheet as a starting material, and using electroplating has been taught in U.S. Pat. No. 4,978,431. In addition, U.S. Pat. No. 5,300,165 proposes a similar method for the manufacture of metallic porous sheets from mesh sheets and non-woven fabric sheets, which can be layered together. Where a preferred porous metal support member is made and electroplating of an open-cell foam is involved, the plating is often nickel plating and the resulting porous nickel sheet will generally have a weight within the range of from about 300 grams per square meter, up to about 5,000 grams per square meter, basis square meters as measured on a major face of the resulting metal foam support member, such as a major face of the support member that is in sheet form. More typically, this will be a sheet weight within the range of from about 400 to about 2,000 grams per square meter.

Generally, if electroplating has been utilized, after the completion of the plating, the resulting metallized article can be washed, dried, and may be thermally treated, e.g., to decompose a polymer core substance. In some instances, the article may be annealed, such as in a reducing or inert atmosphere. Regarding thermal decomposition, U.S. Pat. No. 4,687,553 suggests a multi-stage heat decomposition method. According to the Patent, when nickel is plated, thermal decomposition is conducted at a temperature in the range of about 500° C.–800° C. for up to about three hours depending on the polymeric foam precursor material used.

In battery construction, typically for cylindrical, button and prismatic configured batteries, the support member for a battery electrode will be in a planar, e.g., a plate-like form having a thickness dimension which is less than its width or length. For convenience, this is referred to herein as being in "sheet form". More particularly, the support member will typically be in the form of a strip, with a length in the longitudinal direction and a width in the transverse direction. By way of example, machine produced polyurethane foam precursor materials in strip form, which may have thicknesses of such small dimension as to be measured in only a few millimeters (mm) or less, can be machine produced to have widths in the transverse direction on the order of 6 to 80 inches, and be produced in continuous lengths in the longitudinal direction which can run as great as on the order of 1,000 feet.

Figure 1:
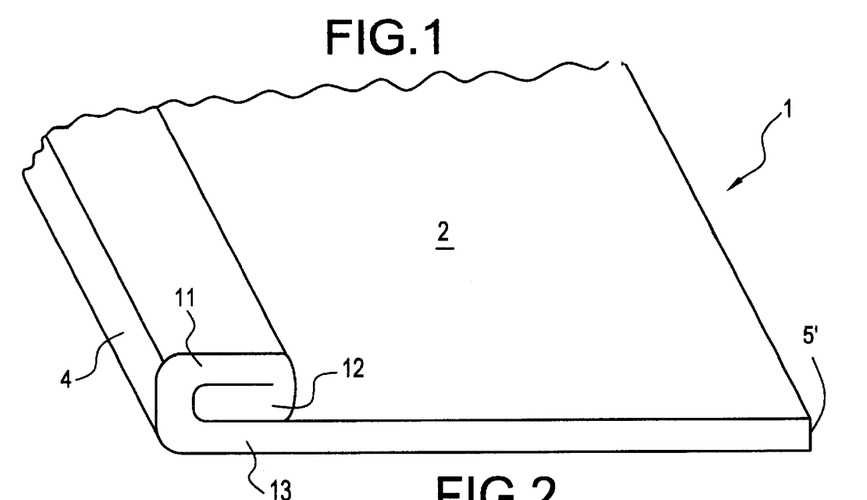
FIG. 1 is a perspective view of an end portion only of a metal foam support member in sheet form and having a stacked edge representative of the present invention.
Figure 9:
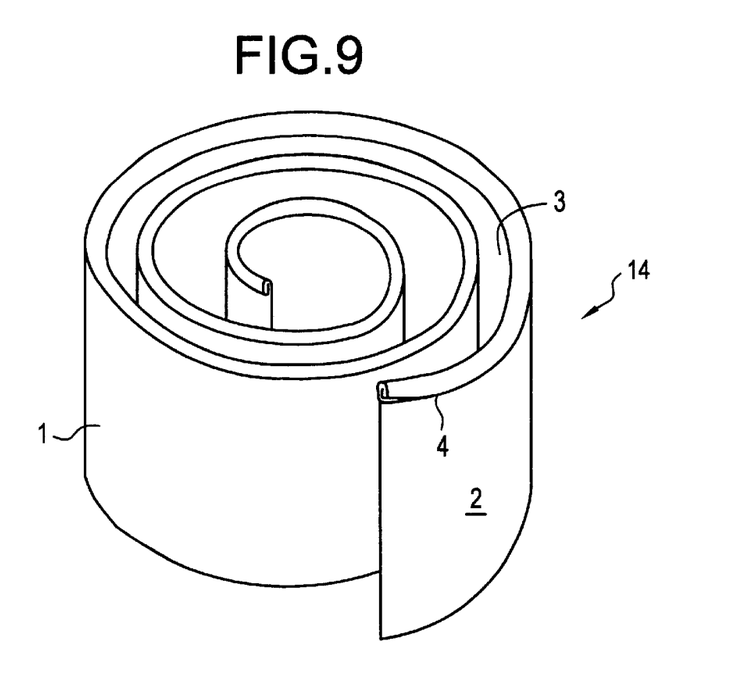
FIG. 9 is a perspective view of an electrode assembly such as is useful in a battery electrode including the metal foam support member of FIG. 1 in coiled form having a representative edge coiling around the geometric axis of the assembly.

Referring then to an illustrative embodiment representative of the present invention as shown in FIG. 1, there is first provided a metal foam support member 1, which is in sheet form. In such sheet form, the metal foam support member 1 has a major front face 2 as well as a major back face 3 (FIG. 9). These faces 2, 3 are flat faces. The thickness of the support member is between the major front face 2 and the major back face 3. Extending in the longitudinal direction of the support member 1 is a long, outer conventional edge 5', sometimes referred to herein as a second edge 5'. This edge 5' is a conventional edge 5' since it is the usual edge that is produced in the production of the metal foam support member 1.

Across the width of the support member 1 from the second edge 5' is a first edge 4, which is in a form in accordance with the present invention and is generally referred to herein as a "stacked edge" 4. These first and second major edges 4, 5' are in opposed, parallel relation. The first edge 4 is formed by folding of the metal foam support member 1, thereby providing three layers or plies. The layers or plies are composed of a top layer 11 and middle layer 12, as well as a bottom layer 13 which is contributed by the support member 1. For convenience, this stacked edge 4 may sometimes be referred to herein as a "coiled edge" or a "roll formed edge".

Preferably, the faces 2, 3 of the support member 1 will be flat faces, which can provide for ease of forming a stacked edge 4. However, particularly where the stacked edge 4 is made with foam strips 15 (FIG. 7), the faces 2, 3 may have irregularities, e.g., minor ripples. Such faces 2, 3 as might have such irregularities are regarded as at least substantially flat faces as this term is used herein. Similarly, the edges 4, 5 of the support 1 are preferably straight edges. However, they may be at least substantially straight, as by having a minor patterned or sine wave shaped edge. Such edges may be most particularly useful with stacked edges 4 of foam strips 15.

Figure 2:
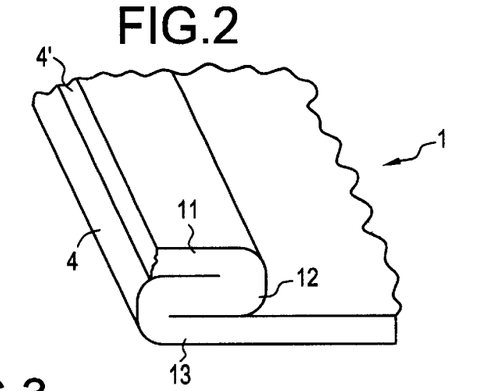
FIG. 2 is a perspective view of an edge portion only of a metal foam support member depicting a variant stacked edge from the edge of FIG. 1.

In FIG. 2, then, there is shown an alternative arrangement of the stacked edge 4, whereby the metal foam support member 1 is bent back upon itself. This is sometimes referred to herein as an "S-shaped edge" or configuration. There is then provided a stack of three layers or plies composed of a top layer 11, a middle layer 12, and a bottom layer 13. The top layer 11 terminates in an original long, outer conventional edge 4' of the support member 1. It is contemplated that arrangements other than a coiled edge or S-shaped configuration may be utilized to form the stacked edge, e.g., a combination of such edges with the use of strips (FIG. 7), as will be discussed herein below.

Figure 3:
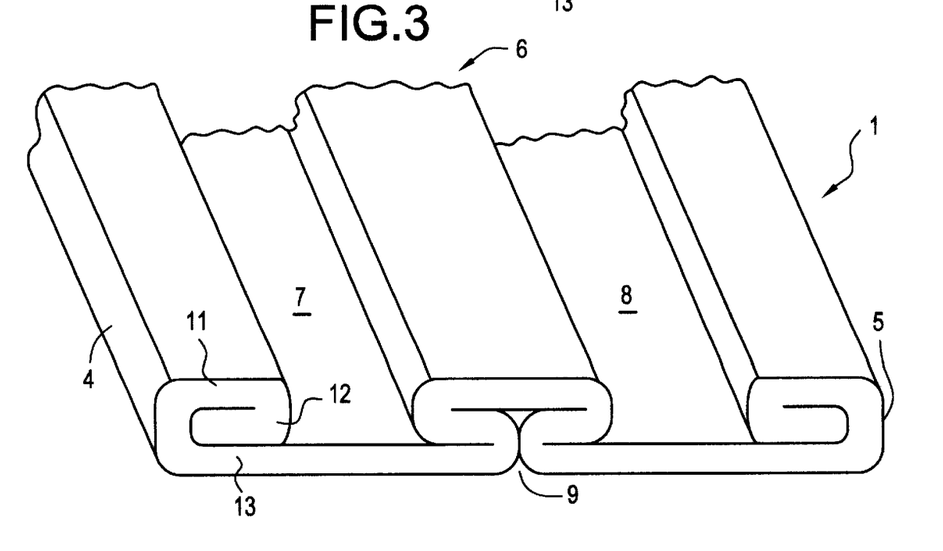
FIG. 3 is a perspective view of a metal foam support member depicting two edges of the metal foam support member that are edges representative of the present invention, as well as a middle stacked layer of the metal foam support member.

In FIG. 3, there is then depicted a metal foam support member 1 having first and second stacked edges 4, 5. The metal foam support member 1 has a central, inverted pleat 6 extending in the longitudinal direction on the front face 2 (FIG. 1) of the support member 1 in a direction substantially parallel to the first and second stacked edges 4, 5. On the back face 3 (FIG. 9), the pleat 6 creates a crease 9 that extends longitudinally along the support member 1. Between each first and second stacked edges 4, 5 and the central inverted pleat 6 are essentially planar areas 7, 8, i.e., at least substantially flat, first and second faces 7, 8.

Figure 4:
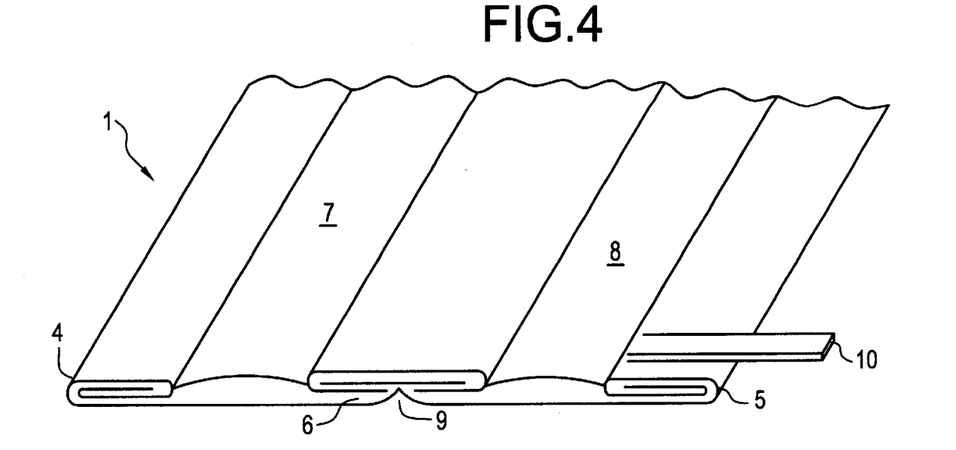
FIG. 4 is a perspective view of the metal foam support member of FIG. 3 in compressed condition and having a connection tab member.

A compressed form of the metal foam support member 1 of FIG. 3, to which a connection tab 10 has been attached, is shown in FIG. 4. Compression can be obtained by any means as are conventional in the industry, i.e., the industry of providing battery electrodes. After such a compression step, the stacked edges 4, 5 and inverted pleat 6 of FIG. 3 will generally have a thickness within the range from about 0.3 mm to about 1.5 mm. Also, after compression, the first and second faces 7, 8 can be slightly bowed, but remain at least substantially flat as the term is used herein.

The connection tab 10 is connected to the stacked edge 5 of the support member 1, usually at one end, and is arranged such that the tab 10 extends outward from a stacked edge 5. Where a large electrode is to be considered, additional connection tabs 10 may be placed at various positions along the stacked edges of the foam support member 1. The connection tab 10, depending on the type of metal foam being utilized for the support member, will normally be a solid, i.e., non-perforate or non-foraminous, metal tab. The metal of the tab can be nickel or copper, including nickel or copper alloys or intermetallic mixtures and will most always be in foil form. The metal connection tab 10 may be any of a variety of shapes including shapes which are rounded, e.g., circles or ovals, as well as shapes which are multi-sided, including triangles, squares, rectangles and the like. However, in the present invention, it is preferred that the connection tab 10 be rectangular in shape for ease of securing to the support member 1. Such securing can be by welding, soldering, brazing or with conductive adhesive.

Figure 5:
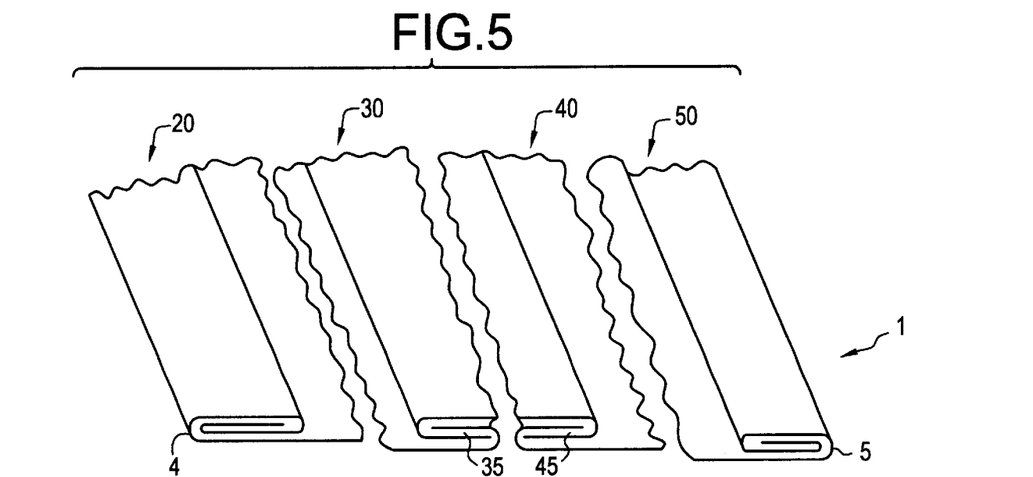
FIG. 5 is a perspective view of the metal foam support member of FIG. 4, without the tab member, cut into sections and depicting the electrode segments provided therefrom.

Referring then to FIG. 5, there is depicted the metal foam support member 1 in compressed form which has been cut, thereby providing a multitude of segments 20, 30, 40, 50. For convenience, these will be referred to herein as electrode segments 20, 30, 40 and 50. As depicted in FIG. 5, the cuts are made along the center line of the first and second at least substantially flat surfaces 7, 8. Additionally, a cut may also be made along the crease of the inverted pleat 6. In this way, each electrode segment 20, 30, 40, 50 is accorded with a stacked edge 4, 5, 35, 45, to which a connection tab 10 (FIG. 4) can be attached. While the edges of the electrode segments 20, 30, 40, 50 produced from the cutting of the metal foam support member 1 appear jagged, it is to be understood that this is for illustrative purposes only, and the edges can be straight edges. The number of electrode segments 20, 30, 40, 50 will be determined by the width of the support member 1 utilized and the size of the battery being produced. It is contemplated that where a wider support member 1 is provided, additional inverted pleats 6 can be made in the support member 1, thereby yielding additional electrode segments 20, 30, 40, 50 upon cutting. It is further contemplated that the inverted pleat 6 may be absent from the metal foam support member 1. In this representative embodiment, the stacked edges 4, 5 are present in opposed, at least substantially parallel relation, with only a simple planar, i.e., at least substantially flat, surface therebetween. Upon cutting of such an embodiment in a longitudinal direction through the support member 1, there will be provided two segments, e.g., the outer segments 20, 50, each having a stacked edge 4, 5.

Figure 6:
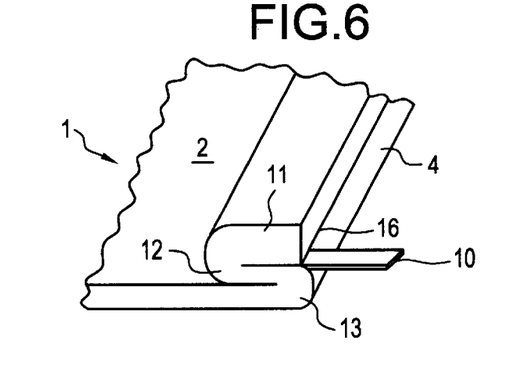
FIG. 6 is a perspective view of the edge portion of FIG. 2 including a connection tab member secured within the edge.

In FIG. 6, there is then shown the metal foam support member 1 with a stacked edge 4 having an S-shaped configuration in cross-section as seen in FIG. 2. Between the top layer 11 and middle layer 12, a connection tab 10 is incorporated within a fold 16 of the S-shaped configuration. The connection tab 10 may be attached in this manner, i.e., by compression of the stacked edge 4 while the tab 10 is positioned within the fold 16, or may be attached by such compression in combination with other means as discussed hereinabove, e.g., welding. Such an arrangement of incorporating the tab 10 between layers 11, 12 of the stacked edge 4 thereby ensures effective contact of the connection tab 10 with the stacked edge 4. In addition to the connection tab 10 supplied in the dimension as shown, the tab 10 may be a sheet extending along the fold 16 and projecting outwardly from the stacked edge 4.

Figure 7:
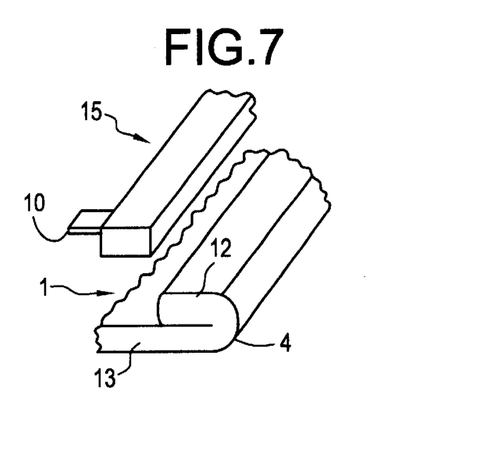
FIG. 7 is an exploded, perspective view of an edge portion only of the metal foam support member, which edge includes an added strip of metal foam that has a connection tab member that is a part of the added strip.

Referring to FIG. 7, there is depicted a stacked edge 4 which has been formed by folding of the metal foam support member 1 in a single fold thus forming a stacked edge 4 composed of two layers, an upper layer 12 and a bottom layer 13. To this double layer arrangement is added on top of the upper layer 12 a third layer comprising a foam strip 15 which may include a connection tab 10, forming a unitary piece of foam. Such a foam piece may hereinafter be referred to as a "foam connection tab unit" or simply "unit". This foam connection tab unit provides a third, or top layer, such as the top layer 11 (FIG. 6) to the stacked edge 4. It is also contemplated that where a plurality of layers is desired, the metal foam support member 1 may be left unfolded, and layers of foam strips 15 can then be provided. Also, the support member 1 can be folded to provide a stacked edge 4 of more than two layers, as in FIG. 1 or FIG. 2, and foam strips 15 could be added. In each case, the foam strips 15 may be provided as connection tab units.

Figure 8:
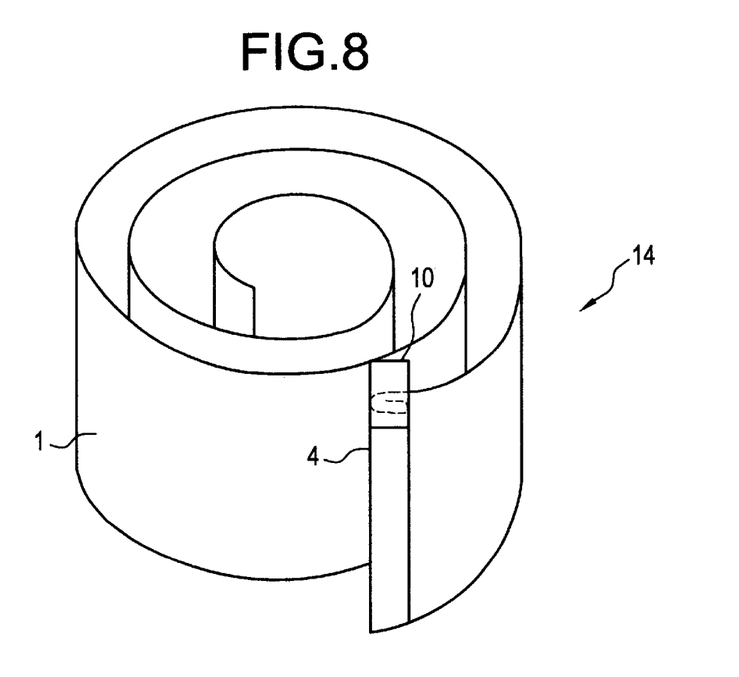
FIG. 8 is a perspective view of an electrode assembly such as is useful in a battery electrode including the metal foam support member of FIG. 1 in coiled form having a representative edge in a direction parallel to the geometric axis of the assembly and having a tab member at the edge.

In FIG. 8 there is presented an electrode assembly 14 comprising the electrode foam support member 1 with a connection tab 10 attached. The assembly 14 is constructed by winding of the foam support member 1 around a central axis in such a manner as to expose a stacked edge 4 to which a connection tab 10 has been secured, to the exterior of the assembly 14. The stacked edge 4 is in a direction parallel to the geometric axis around which the support member 1 is wound. Both the stacked edge 4 and the geometric axis are parallel to the width of the support member 1.

In FIG. 9, then, there is provided an alternative arrangement of the assembly 14. While the support member 1, having a front face 2 and back face 3 is wound in a spiral manner, as in FIG. 8, i.e., parallel to the width of the support member 1, the winding is completed in such a manner that the stacked edge 4 extends along an edge in the longitudinal direction of the support member 1.

While the assembly 14, as depicted in FIGS. 8 and 9, is shaped by spiral winding of the support member 1, it should be understood that the support member 1 can be shaped in any conventional manner, i.e., flat stacks of interwoven layers or flattened spirals. Thus, it is contemplated that an assembly 14, such as in the form of a flattened spiral, could be utilized in a prismatic or button type cell.

In preparing the metal foam support member 1 of the FIGS. 1–3, one or both of the first and second major edges 4, 5 are established to form stacked edges having at least two layers, by folding or coiling the metal foam support member 1 at these edges 4, 5. Such stacked edges are "rigid". By this, it is meant that they are less flexible than the flexible metal foam support member 1 from which they are formed, although the stacked edges themselves may have some flexibility, e.g., for coiling of the support member 1 in the longitudinal direction (FIG. 9). It will be understood that, as used herein, the term "stacked edges" refers to the first and second major edges 4, 5 subsequent to folding or rolling (coiling). The folds or rolls, and pleat 6 can be obtained by any conventional or suitable manner, such as by pressing, roll forming or the like. Generally, where folds are utilized to form the stacked edges 4, 5, the folds will be at an angle of 180° as shown in FIG. 1. Folds are formed such that the metal foam support member 1 edge 4', 5' is bent inwardly, e.g., toward the central inverted pleat 6 on the front face 2. For the FIG. 1 fold, the metal foam support member 1 can then be folded additional times, e.g., once more onto the front face 2, such that the previously folded major edges 4, 5 of the metal foam support member 1 are again folded over onto themselves to form a plurality of layers.

Alternatively, it is within the scope of the invention that the stacked edges 4, 5 may be formed in whole or in part by the application of narrow strips to the metal foam support member 1, including the manner as depicted in FIG. 7. While strips of foam can be utilized, it is contemplated that the strips may comprise layers such as of metal mesh, or felt or woven metal fiber. Notwithstanding the choice of foam support used, e.g., felt or foam, the support member will always be in a metallic form. Depending on the battery cell type and application, the length and width of the strips may vary. However, in similar battery types and applications, preferably, the strips will all be of substantially equal length and width and extend along the whole length of a support member edge. Where larger or smaller cell types are contemplated, the length and width will vary accordingly.

The strips are affixed to the metal foam support member 1, e.g., by welding or use of a conductive adhesive, and are then compressed to seal the layers together so as to form a bond of increased resistance to mechanical separation. While the stacked edge 4 of FIG. 1 is depicted as having three plies 11, 12, 13, it is also contemplated that such stacked edge 4 may be established so as to provide a multitude of layers, e.g., on the order of from 2 layers up to 10 layers or more.

The stacked edges 4, 5 could also be formed by any combination of folds or rolls and strips, such as where the metal foam support member 1 is folded as depicted in FIG. 1 and a strip 15 (FIG. 7) of foam is then placed on top of the top layer 11.

Notwithstanding the manner in which the stacked edges 4, 5 are obtained, e.g., folding or roll forming, each layer will typically be of substantially the same size, so as to form edges 4, 5, which will generally be equal, for example have the same width. Typically, the width dimension of the stacked edges 4, 5 is within the range from about 2 mm. to about 15 mm. The dimensions are established in this manner so as to provide optimum metal foam density in the region to which a connection tab 10 (FIG. 4) may be secured for efficient current collection, without compromising electrode capacity. Generally, the width of the inverted pleat 6 can be two times the width of the stacked edges 4, 5, and be within the range from about 4 mm. to about 30 mm. In a preferred embodiment, the resulting stacked edges 4, 5 will constitute three layers, having an uncompressed thickness for the total of the three layers in the range from about 2 mm. to about 9 mm., depending on the thickness of the starting foam. Such a starting foam thickness, which may typically be from about 0.7 mm to about 3 mm, will be serviceable for securing of a connection tab 10 (FIG. 4) to the metal electrode foam support member 1.

The metal foam support member 1 with stacked edges 4, 5 can be compressed to provide a zone of high metal mass of compressed metal foam at the stacked edges 4, 5 of the support member 1. Before compression, the stacked edges 4, 5 may contain some active material, as from filling the support member 1 before stacking, but such edges will generally be unfilled. At the compressed stacked edges 4, 5, a connection tab 10 (FIG. 4) can be secured. In FIG. 4, there is depicted a compressed form of the metal foam support member which is depicted in FIG. 3 in uncompressed form. Such a compression step could be employed as an additional step, after folds are introduced into the foam substrate, or after one or more foam strips 15 are stacked on a foam support member or stacked edge. It will be understood that the stacked edge itself may be compressed, and such can include pre-compression of any foam strips 15 used in the stacked edge. Also, it is contemplated that where such strips 15 are utilized, some or all of the strips in the stacked edge nay not be compressed, as by compressing a roll formed stacked edge, then adding an uncompressed strip. Usually, such compression is in the direction of the thickness of the foam sheet, i.e., to provide a thinner foam sheet. Such compression is utilized to provide a sheet having a controlled, pre-set sheet thickness.

The foam substrate can then be filled with an active material. For preparing an electrode, the active material for a negative battery electrode can be a hydrogen storage material, generally the $AB_2$ type hydrogen storage alloy, or an $AB_5$, type hydrogen storage alloy. In the $AB_2$ type, A can be an element with a large affinity for hydrogen such as Zr or Ti, and B is a transition metal such as Ni, Mn, or Cr. Members of the $AB_2$ class of hydrogen-absorbing materials may also include the binary $ZrCr_2$, $ZrV_2$ and $ZrMo_2$, although all of this class of hydrogen-absorbing material are contemplated as being useful in the present invention. The $AB_5$ class of alloys can be referred to as the rare-earth (Misch metal) alloys based around lanthanum nickel. Thus, A can be represented by lanthanum, while B might be defined as above. The $AB_5$ type negative materials for battery negative electrodes are well known and many materials are described in the prior art. All such hydrogen storage alloys are contemplated as useful in preparing a negative electrode of the present invention. For a nickel-cadmium battery, the negative electrode cadmium active material will comprise cadmium metal.

Where the metal foam support member 1 is to be formed for use as a positive electrode, any of the positive electrodes as are conventional or as are contemplated for use in a battery will be useful in the present invention. Typically, such a positive electrode will contain a positive active material, usually composed of a metal oxide, in a support. A representative active material comprises nickel oxyhydroxide. Additionally, for the positive active material, there may be used a lithiated transition metal intercalation compound.

Regardless of the active material utilized, such material will generally be made into a paste or slurry, typically using water or an organic solvent, although it is contemplated that the use of dry, finely divided active material, may also be employed. The paste or slurry is then introduced into the metal foam support member 1, such as by any process for introducing a paste or slurry material into a foam type substrate, e.g., roll coating, spray application, or pressure or vacuum application. In a preferred embodiment, the paste or slurry is introduced into the metal foam support member subsequent to folding and compression of the stacked edges 4, 5. In this manner, thorough pre-compression of the stacked edges 4, 5 will limit the accumulation of active material in the area to which a connection tab 10 is to be attached. However, it is also contemplated that the active material may be applied prior to compression of the support member 1.

Subsequent to compression and filling of the foam support member 1, the support member 1 can be cut. In preparing the electrode segments 20, 30, 40, 50 cuts are introduced into the metal foam support member 1 in the longitudinal direction by any conventional or suitable manner. Generally, the electrode segments 20, 30, 40, 50 will be prepared following filling of the foam support member 1 with active material. However, it is also contemplated that cutting of the support 1 could precede the filling step.

Following cutting of the foam support member 1, a connection tab 10 can be secured to the increased mass of the metal foam support member 1 provided by the stacked edge 4,5. The area to which the connection tab 10 is to be attached is first cleaned as by ultrasonic cleaning in order to remove any active filling material and provide an effective area, such as for welding. Welding can be by any conventional technique, e.g., electrical resistance, TIG (tungsten-inert gas) or MIG (metal-inert gas). It is also contemplated to use other methods for securing the connection tab 10, as has been mentioned hereinbefore, e.g., a conductive adhesive, ultrasonic welding or soldering of the connection tab 10 to the metal foam support member 1.

Electrodes in the battery can be separated with a usually synthetic, typically non-woven material. The separator may serve as an insulator between electrodes as well as a medium for absorbing an electrolyte, e.g., an alkali electrolyte. A representative separator material is a nylon or a polypropylene non-woven fabric. The polypropylene fabric could be of sulfonated polypropylene. The separator may have, for example, on the order of a 60 percent to 70 percent porosity. A serviceable electrolyte solution for a nickel metal hydride battery can be an aqueous potassium hydroxide solution. Such solution may contain lithium hydroxide, e.g., a 35 percent Li-KOH electrolyte solution.

What is claimed is:

1. A metal foam support member in sheet form having length in the longitudinal direction, width in the transverse direction, thickness in the direction between front and back major faces of said sheet form support member, and first and second long, outer edges in said longitudinal direction positioned at least substantially parallel to one another, which metal foam support member comprises at least substantially one layer of metal foam and has at least one outer edge that is a stacked edge of a plurality of at least two layers of metal foam established by folding, at a long outer edge of said sheet, one layer of metal foam support member over on itself to provide a stacked edge including at least two layers of said metal foam support member, and with at least one layer of said stacked edge that is a layer situated on a support member major face.

2. The support member of claim 1 wherein said long outer edges are at least substantially straight edges, said major faces are at least substantially flat major faces.

3. The support member of claim 2 wherein said stacked edge extends at least substantially the entire length of a long outer edge, said stacked edge comprises said support member folded back on itself at an angle of 180°, and said stacked edge is a roll formed edge.

4. The support member of claim 2 wherein said stacked edge is established by folding said edge of two layers over onto a layer of support member metal foam to provide a stacked edge of three layers of metal foam, and each layer of said stacked edge has at least substantially the same width dimension.

5. The support member of claim 1 wherein said stacked edge is a three-layer stacked edge, S-shaped in cross-section, and said stacked edge is established by folding a long outer edge of one layer of metal foam over on itself in a back-and-forth fold.

6. The support member of claim 1 wherein said stacked edge is a compressed edge having a thickness in the range from about 0.3 mm to about 1.5 mm or an uncompressed edge having a thickness in the range of from about 2 mm to about 9 mm.

7. The support member of claim 1 further comprising an additional stacked layer of said metal foam support positioned on a major face of said support member and spaced apart thereon from an outer edge.

8. The support member of claim 7 wherein said additional stacked layer is positioned at least substantially centrally along the length of said support member on said front major face, which face further comprises an at least substantially flat face area positioned between said stacked edge and said additional stacked layer, and the width of said additional stacked layer is at least about twice the width of a stacked edge.

9. The support member of claim 8 wherein said front major face contains said additional stacked layer provided by folding said metal foam support member, and said back major face contains an at least centrally located groove provided by said folding, which groove is positioned parallel to said first and second outer edges.

10. The support member of claim 1 wherein said metal foam support member in sheet form has a thickness in the range of from about 0.7 mm to about 3 mm, is a porous sheet having a pore size of from about 5 ppi to about 150 ppi, and said support member is flexible while said stacked edge is rigid.

11. The support member of claim 1 wherein the metal of said foam support member is electroplated metal.

12. The support member of claim 1 wherein the metal of said foam support member is a metal selected from the group consisting of nickel, chromium, zinc, copper, tin, titanium, lead, iron, gold, silver, platinum, palladium, rhodium, aluminum, cadmium, cobalt, indium, vanadium, thallium and gallium, their alloys and intermetallic mixtures.

13. The support member of claim 1 further comprising a tab member at said stacked edge, which tab member is a metal tab member that is joined to said edge by one or more of welding, soldering, brazing or adhering with conductive adhesive.

14. The support member of claim 13 wherein said metal tab member is a solid metal tab member containing a metal selected from the group consisting of nickel, copper, their alloys and intermetallic mixtures, and said metal tab member plus a layer of said stacked edge are provided by said foam member.

15. The support member of claim 1 wherein said stacked edge comprises a folded stacked edge plus at least one strip of metal foam, which strip includes a tab member.

16. A metal hydride secondary battery containing the support member of claim 1 as a negative or positive electrode.

17. A nickel-cadmium secondary battery containing the support member of claim 1 as a negative or positive electrode.

18. A lithium-ion battery containing the support member of claim 1 as a negative or positive electrode.

19. An electrode comprising a layer of a metal foam support member in sheet form containing an active filling, said metal foam support member having length in the longitudinal direction, width in the transverse direction, thickness in the direction between front and back major faces of said sheet form support member, and first and second long outer edges in said longitudinal direction positioned at least substantially parallel to one another, which metal foam support member comprises at least substantially one layer of metal foam and has at least one outer edge that is a stacked edge of a plurality of at least two layers of metal foam established by folding, at a long outer edge of said sheet, one layer of metal foam support member over on itself to provide a stacked edge including at least one layer of said metal foam support member, and with at least one layer of said stacked edge that is a layer situated on a support member major face.

20. The electrode of claim 19 wherein said long outer edges are at least substantially straight edges, said faces are at least substantially flat major faces.

21. The electrode of claim 19 wherein said stacked edge extends at least substantially the entire length of a long outer edge, said stacked edge comprises said support member folded back on itself at an angle of 180°, and said stacked edge is a roll formed edge.

22. The electrode of claim 19 wherein said stacked edge is established by folding said edge of two layers over onto a layer of support member metal foam to provide a stacked edge of three layers of metal foam, and each layer of said stacked edge has at least substantially the same width dimension.

23. The electrode of claim 20 wherein said folded stacked edge is an unfilled, compressed edge having a thickness in the range from about 0.3 mm to about 1.5 mm, or an uncompressed, unfilled edge having a thickness in the range of from about 2 mm to about 9 mm.

24. The electrode of claim 19 wherein said metal foam support member in sheet form has a thickness in the range of from about 0.7 mm to about 3 mm and has a pore size of from about 5 ppi to about 150 ppi.

25. The electrode of claim 19 wherein the metal of said foam support member is electroplated metal.

26. The electrode of claim 19 wherein the metal of said foam support member is a metal selected from the group consisting of nickel, chromium, zinc, copper, tin, titanium, lead, iron, gold, silver, platinum, palladium, rhodium, aluminum, cadmium, cobalt, indium, vanadium, thallium and gallium, their alloys and intermetallic mixtures.

27. The electrode of claim 19 further comprising a tab member at said stacked edge, which tab member is a metal tab member that is joined to said edge by one or more of welding, soldering, brazing or adhering with conductive adhesive.

28. The electrode of claim 27 wherein said metal tab member is a solid metal tab member containing a metal selected from the group consisting of nickel, copper, their alloys and intermetallic mixtures.

29. A method of producing an electrode comprising a layer of a metal foam support member containing an active filling, said metal foam support member having length in the longitudinal direction, a width in the transverse direction, front and back faces, and first and second long, outer edges in said longitudinal direction positioned at least substantially parallel to one another, with at least one outer edge that is a stacked edge of a plurality of at least two layers of metal foam including at least one layer of said metal foam support member, and with at least one edge layer that is situated on a support member face, which method comprises the steps of:

(1) providing a metal foam support member in sheet form as a layer of said metal foam;

(2) establishing at least one of said support member outer edges as a stacked edge established by folding said support member, and comprising at least two metal foam layers, with at least one layer on a major face of said support member;

(3) compressing said stacked edge;

(4) introducing active filing material into said sheet form electrode support member; and (5) cutting said filled support member to provide said electrode as a segment of said filled support member having a compressed stacked edge.

30. The method of claim 29 wherein said stacked edge is established by folding said support member, and said stacked edge is compressed in the direction of the thickness thereof to a thickness in the range from about 0.3 mm to about 1.5 mm.

31. The method of claim 29 wherein said stacked edge is established by roll forming said support member.

32. The method of claim 29 wherein said active filling material is introduced into said foam support member by one or more of spray application, roll coating, pressure coating and vacuum application and said active filling is selected from the group consisting of hydrogen absorbing, intercalating, lithiating and cadmium fillings.

33. The method of claim 29 further comprising securing a metal tab member to at least one stacked edge of said support member.

34. The method of claim 29 wherein said metal tab member is a solid metal tab member of nickel, copper, their alloys and intermetallic mixtures, and said tab member is secured to said stacked edge of said metal foam support member by one or more of welding, soldering, brazing or adhering with conductive adhesive.

35. A battery electrode made by the method of claim 29.

36. A battery having a battery electrode made by the method of claim 29.

37. An electrode assembly comprising an electrode having a thin layer of a metal foam support member in sheet form containing an active filling, said metal foam support member having length in the longitudinal direction, width in the transverse direction, thickness in the direction between front and back major faces of said sheet form support member, and first and second long, outer edges in said longitudinal direction positioned at least substantially parallel to one another, which metal foam support member comprises at least substantially one layer of metal foam and has at least one outer edge that is a stacked edge of a plurality of at least two layers of said metal foam established by folding, at a long outer edge of said sheet, one layer of metal foam support member over on itself to provide a stacked edge, with at least one layer of said stacked edge that is a layer situated on a support member major face, and with the electrode of said electrode assembly being spirally wound around a geometric axis.

38. The assembly of claim 37 wherein said electrode is spirally wound around an axis that is parallel to said transverse direction and said stacked edge is positioned in said longitudinal direction or in said transverse direction.

39. The assembly of claim 37 comprising a tab member at said stacked edge which tab member is a metal tab member that is a solid metal tab member containing a metal selected from the group consisting of nickel, copper, their alloys and intermetallic mixtures, and said tab member is secured to said stacked edge by one or more of welding, soldering, brazing or adhering with conductive adhesive.

* * * * *